Feb. 20, 1968   E. A. GLOS II   3,369,668
FILTER MEDIUM
Filed April 9, 1965   2 Sheets-Sheet 1
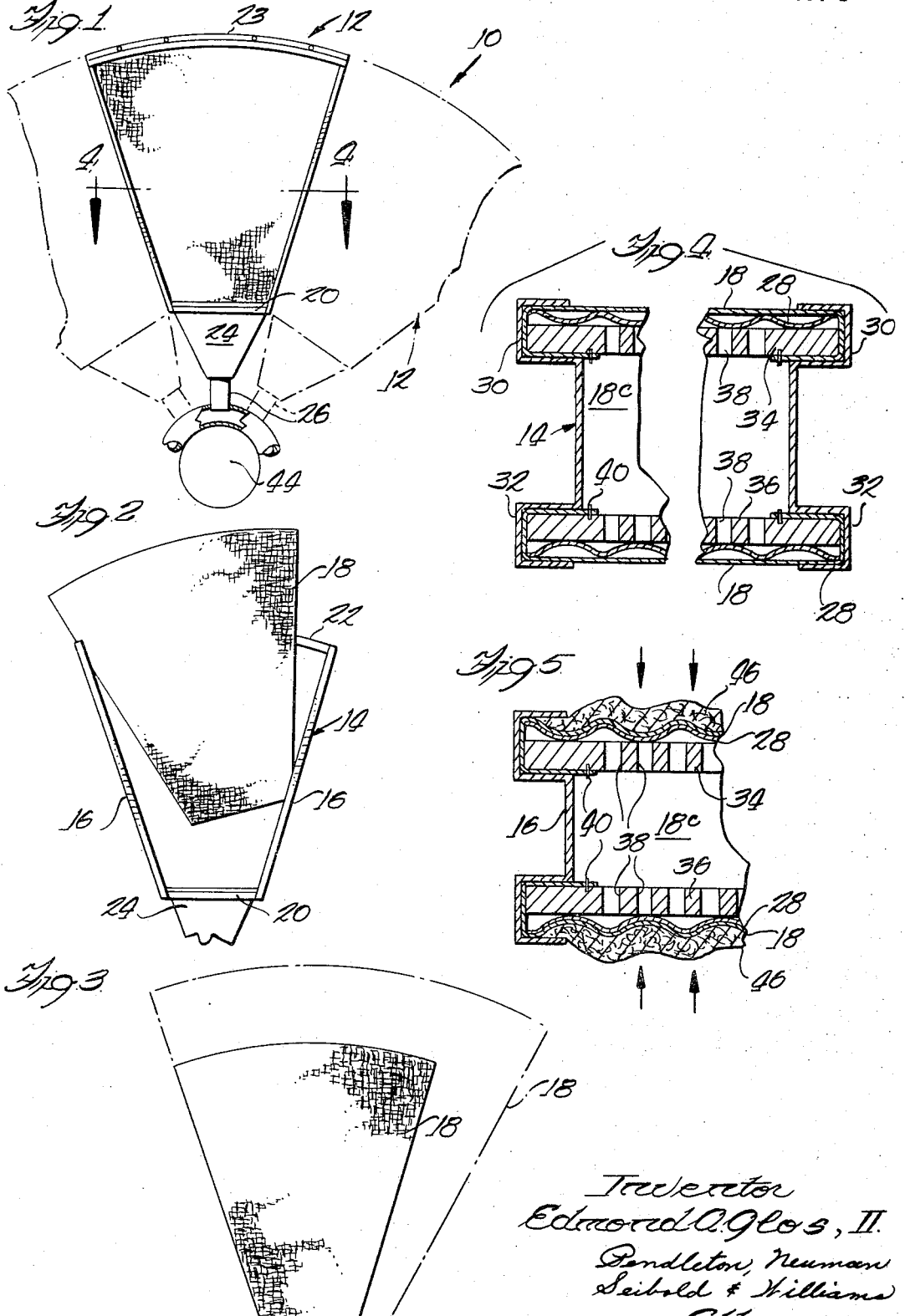
Inventor
Edmond A. Glos, II
Pendleton, Neuman
Seibold & Williams
Attorneys Feb. 20, 1968 E. A. GLOS II 3,369,668
FILTER MEDIUM
Filed April 9, 1965 2 Sheets-Sheet 2
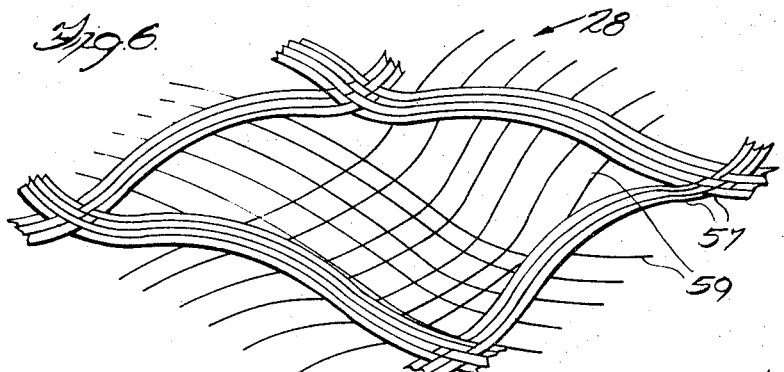
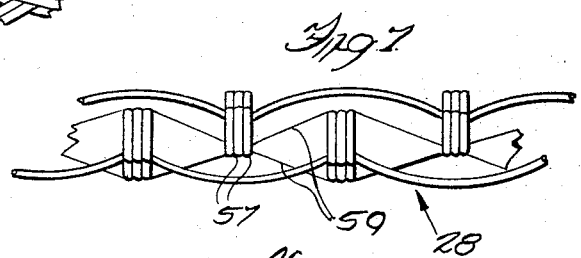
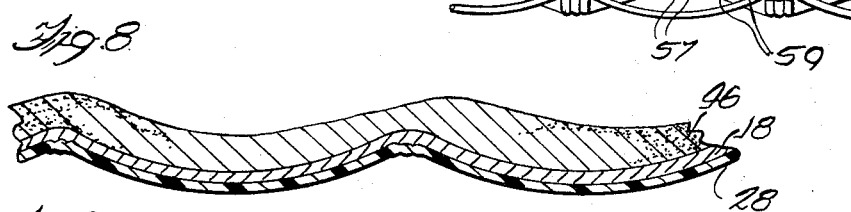
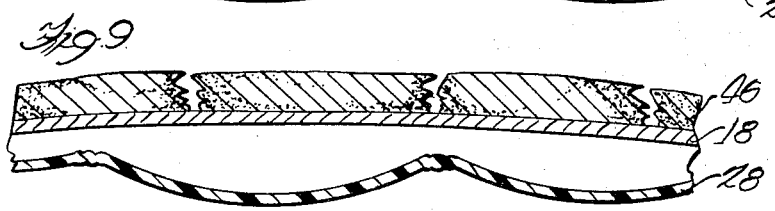
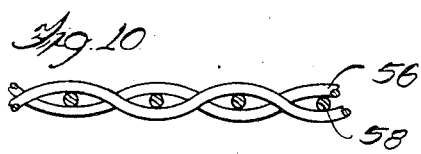
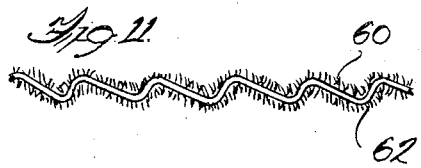
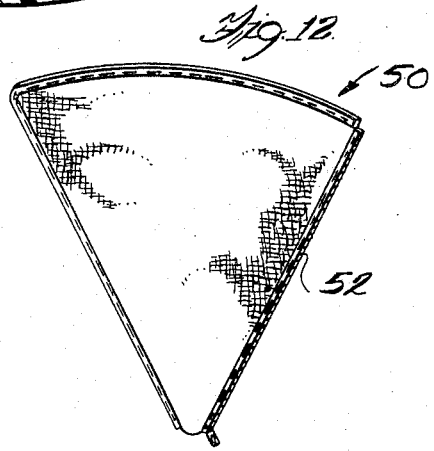

ced Feb. 20, 1968

United States Patent Office 3,369,668
Patented Feb. 20, 1968

3,369,668
FILTER MEDIUM
Edmond A. Glos II, Deerfield, Ill., assignor to Mero & Company, Inc., Chicago, Ill., a corporation of Illinois
Filed Apr. 9, 1965, Ser. No. 446,946
2 Claims. (Cl. 210—345)

ABSTRACT OF THE DISCLOSURE

Filter medium employing a stretchable filter cloth having interstitial pores in combination with a supporting screen wherein the filter cloth automatically stretches to increase the pore size as an applied pressure differential increases and is self-cleaned when the pressure differential is reversed.

The present invention relates to filtration, and more particularly pertains to an improved filter medium.

The art relating to filtration comprising the separation of solids from a liquid by passing the liquid through a porous medium is well developed. Filtration is employed extensively in industry, as in chemical industries which employ petroleum refineries and causticizing plants. Also, in the mining industry filtration is in widespread use, as in the recovery of desired concentrates, separated by flotation, which are filtered and recovered while the undesired carrier solution is discarded.

Selection of the proper filter medium is of prime importance during the normal filtering operation, although the medium merely supports the filter cake on which the solid accumulation takes place. An efficient filter medium should possess good strength, the ability to initiate filter cake formation on the surface thereof while affording a minimum resistance to flow therethrough and avoiding complete pore clogging, and the ability to readily and efficiently discharge a formed cake from the surface thereof.

It is an object of this invention to provide a novel stretchable filter medium which may be readily attached and removed from a large variety of known filtering apparatus.

It is a further object of this invention to provide a stretchable filter medium which may be employed with a supporting screen having a waffle-like surface to provide maximum filtering area, as will hereinafter be explained in greater detail.

It is another object of this invention to provide a filter medium which automatically stretches to increase the pore space as the applied pressure differential increases.

It is still another object of this invention to provide a filter medium which is self cleaning since reversal of air flow during filter cake removal will stretch the fabric thereby mechanically forcing the filter cake to break and flake from the cloth.

The above and other objects of this invention will become more apparent from the following detailed description when read in the light of the accompanying drawing and appended claims.

In one embodiment of this invention, a fiber having good stretch characteristics is woven into panels which are adapted to be placed over a forming screen having a waffle-like surface. The filter cloth and forming screen define outer wall structure of a filtering apparatus through which a solution to be filtered is drawn by suction or forced by pressure. The resiliency inherent in the filter cloth increases the efficiency of the filtering step by increasing the cloth pore size as pressure differential increases, drawing the cloth against the supporting screen. Also, the resilient cloth facilitates filter cake removal by being distended in a direction away from the forming screen so as to readily break the cake from the cloth, as will hereinafter be disclosed in greater detail.

For a more complete understanding of the invention, reference will now be made to the drawing wherein:

FIGURE 1 is a fragmentary side elevation view of a composite filtering system utilizing filtering media made in accordance with the teachings of this invention;

FIG. 2 is a fragmentary side elevational view of a filtering apparatus wherein a panel of filter cloth made in accordance with this invention is disclosed in a partially removed position;

FIG. 3 is a side elevational view illustrating by means of dotted lines the area to which a filter panel of this invention may expand;

FIG. 4 is a fragmentary sectional view taken along line 4—4 of FIG. 1;

FIG. 5 is a view similar to FIG. 4 showing a filter cake built up on the illustrated filtering apparatus;

FIG. 6 is a fragmentary perspective view of a forming screen of plastic filaments which may be employed with the filtering medium of this invention;

FIG. 7 is an elevational view illustrating the type of weave employed in joining the filaments in the forming screen of FIG. 6;

FIG. 8 is an enlarged sectional view illustrating a filter cake which has built up over a stretchable filtering medium and screen which forms the same;

FIG. 9 is a view similar to FIG. 8 illustrating a stretchable filtering medium and cake after they have been forced from a forming screen;

FIG. 10 is an enlarged elevational view, partly in section, illustrating a plain type of weave which may be employed in forming a suitable filter panel made pursuant to this invention;

FIG. 11 is an enlarged elevational view of one filament of a stretchable filtering medium herein disclosed; and FIG. 12 is an elevational view of a bag filter which may be formed from a stretchable filter cloth.

The filter medium or cloth hereinafter described is exemplified by cloths woven of polyurethane monofilament fiber developed by the Du Pont Company and marketed under the trademark Lycra. The filter medium of this invention may be produced from monofilaments in various deniers and may be woven into various weave designs in accordance with the requirements of the specific filtering apparatus employed.

The stretch filaments may be employed in plain weaves, such as are employed in making the cotton duck filter media. The stretch filaments may also be employed in the manufacture of twills characterized by diagonal weaves, as well as chain weaves, etc. The filter medium of this invention is adapted to be employed in filters of all types, including gravity filters, pressure filters, as well as intermittent and continuous vacuum filters.

Referring now more particularly to FIGS. 1 through 5, a filter medium made in accordance with this invention is illustrated in combination with filtering apparatus 10, such as is disclosed in my copending application Serial No. 401,386, which was filed in the United States Patent Office on October 5, 1964. It will be noted from FIG. 1 that the apparatus 10 is composed of a number of filtering sections 12, each of which is in the general configuration of a frustum of a wedge.

Each filtering section comprises a frame 14, which includes oppositely disposed converging side wall portions 16 which define therebetween in part, substantially trapezoidal open faces in which a filtering medium, such as stretchable sheets of substantially trapezoidal configuration 18, is adapted to be disposed. The lower end limits of the side walls are connected to a section bottom frame portion 20, and the upper end limits of the side walls 16 are connected by an arcuate frame portion 22.

The lower frame portion 20 of the section frame 14 is disposed adjacent and communicates with a header or plenum chamber 24 from which a connecting tube 26 (see FIG. 1) extends. The latter tube is in turn in communication with pressure and vacuum systems adapted to create a pressure differential between opposite sides of the walls defining each of the filter sections 12.

In the normal course of operation a filter sheet 18, a forming screen 28 and a filter-supporting member (members 34 and 36) of substantially the same general trapezoidal configuration defined by the opposed main sides of the apparatus frame sections 14 are slidably inserted as integral units into winged channels 30 and 32 comprising portions of the opposed side walls 14 of the illustrated framework, as seen in FIGS. 4 and 5. The filter-supporting members 34 and 36 have large transverse openings 38 formed therein to facilitate fluid flow therethrough.

The sheets 18, formed of a stretchable fabric and having the same general trapezoidal configuration as the forming screen and filter-supporting members, are disposed over the forming screens 28 and around the side edges of the filter-supporting members, preferably in an unstretched condition. As is most clearly seen in FIGS. 4 and 5, the edges of the filter cloths 18 may be secured, as by means of staples 40 or equivalent means, to the underlying filter-supporting members. It will be noted from FIG. 3 that each sheet of filter cloth 18 may be greatly distended in area so as to form the enlarged area illustrated in dotted lines in FIG. 3.

To complete the enclosing of the frame of each filtering section 12, an upper locking channel 23 is bolted or otherwise suitably secured to arcuate frame portion 22. A vacuum may then be drawn through the connecting tubes 26, plenum chambers 24 and opposed sheets 18 as the various filtering sections rotated about a shaft 44 are disposed in a solution to be filtered. A regulating valve of well-known construction, not illustrated, may be employed to govern pressure differentials and place section chambers 18c under superatmospheric pressure while rotating above the solution to be filtered to facilitate removal of the filter cake.

Outer radial portions of the rotating filtering sections 12 are adapted to be dipped into a solution to be filtered whereupon the reduced pressure in section chambers 18c occasioned by the vacuum drawn through tubes 26 and plenum chambers 24 will draw fluid into the chambers, depositing a filter cake 46 on the surfaces of the sheets 18, in the manner illustrated in FIG. 5. After adequate cake has built up on the surfaces of sheets 18, superatmospheric pressure may be forced through the connecting tubes 26 and plenums 24 into the filtering section chambers 18c with the assistance of a regulating valve, to outwardly distend the stretchable filter sheets 18, thereby cracking the cake and facilitating removal of the same from the sheet surfaces.

The forming screens 28 interposed between the filter-supporting members 34 and the filter cloths 18, may be composed of thermoplastic filaments. The latter filaments may be interwoven and then deformed while heated so as to have a waffle-like surface of repeating projections and depressions throughout. FIGURE 7 illustrates one type of weave which may be employed in joining the plastic filaments together. It will be seen from FIG. 6 that borderlike filaments 57 in adjacent relationship form non-planar, square frameworks within which spaced filaments 59 defining an open weave intersect.

By employing the forming screens 28 having waffle-like surfaces of repeating depressions and projections, additional surface area into which the stretchable sheets 18 may distend is provided. Accordingly, upon the exertion of increasingly greater vacuum within the chambers 18c of each filtering section, an increasingly greater surface area of the filter sheets 18 will become available as the material thereof deforms to conform with the surface of the forming screens 28, in the manner illustrated in FIGS. 5 and 8. As above pointed out, with increasing vacuum the pores of the sheets 18 tend to become larger as the resilient filaments which are interwoven tend to stretch farther apart. The stretching ability of the cloth filaments enables adequate pore openings to be available for passage of the filtrate after cake buildup has increased the pressure differential on opposed sides of the cloth 18, thereby providing high filtering efficiency for a maximum time period.

FIG. 9 is an enlarged view indicating the manner in which the filter sheet 18 and the cake 46 formed thereon may be forced from the waffle-like surface of the forming screen 28 upon the application of pressure to the interior of the chambers 18c of the filtering apparatus 10. Since the initial cake surface formation follows the contour of the supporting screen 28, as seen in FIG. 8, outward urging of the stretchable cloth 18 by means of superatmospheric pressure forces the formed cake to vary its initial waffle-like surface and crack.

In FIG. 12 a bag 50 formed from the stretchable filtering cloth is disclosed, which is adapted to be mounted over a rotatable sector, such as is disclosed in my co-pending application Serial No. 346,182, filed February 20, 1964, and now abandoned. It will be noted that the latter bag construction possesses a zipper 52 to facilitate attachment to and removal from a supporting reinforcing member, such as may be employed in a continuous or semicontinuous filtering apparatus of types well known in the art.

The above-described filtering medium may be formed of a stretch material into a fabric by means of a simple weave, illustrated in FIG. 10, in which the woof and warp 56 and 58, respectively, interweave as shown. In FIG. 11, an enlarged view of a thread of a stretch material, such as Lycra, is illustrated depicting fine filaments 60 extending in a generally radial manner from the main fiber member 62. It is believed that the extremely fine filaments 60 assist in initially entrapping the very fine particles suspended in the fluid being filtered. Since the cake 46 is normally in a moistened, unhardened condition when separated from the cloth 18, the filaments 60 are readily released from the cake 46 when the same is broken from engagement with the stretchable filter cloth.

The specific apparatus embodiments for use with the stretchable filter cloth 18 have been given by way of example only. As above pointed out, stretchable filter cloth may also be employed in continuous rotary drum filters in which abutting elongate strips of filter cloth continuously rotate into and out of a solution being filtered.

Although the foregoing descriptions have indicated that the filter cloth may be employed in systems in which a vacuum draws liquid through the cloth, obviously, superatmospheric pressure may be employed for driving a solids-containing liquid through the filter cloth, and the particular means for creating a differential pressure on opposed sides of the filter cloth is not of great significance.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a filtering apparatus employing a plurality of frames with each frame having an opening through which liquid to be filtered is passed and a means to hold a filter panel in place, the improvement comprising a generally planar filter support member having apertures therethrough disposed in said opening, a forming screen of generally non-planar surface configuration as compared to said filter support member; said forming screen having a waffle-like surface of repeating projections and depressions throughout and overlying said filter support member, and a stretchable filter cloth overlying said forming screen and attached to said filter support member; said stretchable cloth having interstitial pores whereby when the filtering apparatus is in the operative stage the stretchable cloth stretches and deforms to conform with the surface of the forming screens and the pores become larger thereby allowing filtrate to pass therethrough.

2. The apparatus according to claim 1 wherein the stretchable filter cloth is a fabric woven from stretchable threads with each thread having a plurality of fine filaments extending in a generally radial manner therefrom.

References Cited

UNITED STATES PATENTS

| | | | |
|---|---|---|---|
| 2,338,549 | 1/1944 | Shriver et al. | 210—6 X |
| 2,826,308 | 3/1958 | Koupal | 210—356 X |
| 2,964,194 | 12/1960 | Oliver et al. | 210—331 X |
| 3,291,310 | 12/1966 | Marvel | 210—356 X |

ZAMIH N. ZAHARNA, *Primary Examiner.*